United States Patent
Arthur et al.

(10) Patent No.: US 11,349,150 B2
(45) Date of Patent: May 31, 2022

(54) CERAMIC SOFT COMPOSITES FOR SOLID-STATE BATTERIES

(71) Applicant: TOYOTA MOTOR ENGINEERING & MANUFACTURING NORTH AMERICA, INC., Plano, TX (US)

(72) Inventors: Timothy S. Arthur, Ann Arbor, MI (US); Nikhilendra Singh, Ypsilanti, MI (US); Rana Mohtadi, Northville, MI (US); Oscar Tutusaus, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 223 days.

(21) Appl. No.: 16/528,946

(22) Filed: Aug. 1, 2019

(65) Prior Publication Data

US 2021/0036359 A1   Feb. 4, 2021

(51) Int. Cl.
*H01M 10/0562* (2010.01)
*H01M 10/0525* (2010.01)
(Continued)

(52) U.S. Cl.
CPC ..... *H01M 10/0562* (2013.01); *H01M 4/1397* (2013.01); *H01M 10/0525* (2013.01);
(Continued)

(58) Field of Classification Search
CPC ......... H01M 10/0562; H01M 10/0525; H01M 4/1397; H01M 2300/0088;
(Continued)

(56) References Cited

U.S. PATENT DOCUMENTS 4,201,839 A    5/1980   Johnson et al.
5,332,483 A    7/1994   Gordon
(Continued)

FOREIGN PATENT DOCUMENTS

CN    110061285    *  7/2019    ........ H01M 10/0525
EP    1 763 099 A2    3/2007
WO    WO 2017/143348 A2    8/2017

OTHER PUBLICATIONS

International Search Report and Written Opinion of the International Searching Authority dated Oct. 6, 2020 in PCT/US2020/044576, 10 pages.

(Continued)

*Primary Examiner* — Cynthia K Walls
(74) *Attorney, Agent, or Firm* — Oblon, McClelland, Maier & Neustadt, L.L.P.

(57) ABSTRACT

The present disclosure relates to a composite material of formula (I): $(LPS)_a(OIPC)_b$ wherein each of a and b is a mass % value from 1% to 99% such that a+b is 100%; (LPS) is a material selected from the group consisting of $Li_3PS_4$, $Li_7P_3S_{11}$, $Li_{10}GeP_2S_{11}$, and a material of formula (II): $xLi_2S.yP_2S_5.(100-x-y)LiX$; wherein X is I, Cl or Br, each of x and y is a mass % value of from 33.3% to 50% such that x+y is from 75% to 100% and the total mass % of $Li_2S$, $P_2S_5$ and LiX is 100%; and (OIPC) is a salt of a cation and a closo-borane cluster anion.

14 Claims, 7 Drawing Sheets
(6 of 7 Drawing Sheet(s) Filed in Color)

(51) Int. Cl.
*H01M 4/1397* (2010.01)
*H01M 4/02* (2006.01)

(52) U.S. Cl.
CPC .................. *H01M 2004/027* (2013.01); *H01M 2004/028* (2013.01); *H01M 2300/0088* (2013.01)

(58) Field of Classification Search
CPC ..... H01M 2004/028; H01M 2004/027; H01M 4/525; H01M 4/505; H01M 4/382; H01M 4/131; H01M 4/62; H01M 2300/0068; H01M 10/052; Y02E 60/10
See application file for complete search history.

(56) References Cited

U.S. PATENT DOCUMENTS

| | | | |
|---|---|---|---|
| 6,703,153 | B1 | 3/2004 | Cubukcu et al. |
| 9,293,796 | B2 | 3/2016 | Lanning et al. |
| 9,455,473 | B1 | 9/2016 | Mohtadi et al. |
| 9,722,279 | B2 | 8/2017 | Mizuno et al. |
| 2008/0063945 | A1 | 3/2008 | Ivanov et al. |
| 2014/0038061 | A1 | 2/2014 | Mohtadi et al. |
| 2017/0279154 | A1 | 9/2017 | Young et al. |
| 2018/0034033 | A1 | 2/2018 | Ramsayer et al. |
| 2018/0358654 | A1 | 12/2018 | Forsyth et al. |
| 2019/0020060 | A1 | 1/2019 | Angell et al. |
| 2019/0348705 | A1* | 11/2019 | Chen ................ H01M 10/0562 |
| 2020/0052285 | A1 | 2/2020 | Arthur et al. |

OTHER PUBLICATIONS

International Search Report and Written Opinion of the International Searching Authority dated Nov. 6, 2020 in PCT/US2020/044576, 7 pages.

Bjarne R. S. Hansen, et al., "Metal boranes: Progress and applications", Coordination Chemistry Reviews, Dec. 2015, pp. 1-11.

Nahid Iranipour, et al., "Effect of secondary phase on thermal behaviour and solid state ion conduction in lithium doped N-ethyl-N-methylpyrrolidinium tetrafluoroborate organic ionic plastic crystal", Journal of Materials Chemistry A, RSC Publishing, 2013, pp. 1-14.

Liyu Jin, et al., "An organic ionic plastic crystal electrolyte for rate capability and stability of ambient temperature lithium batteries", Enery & Environmental Science, vol. 7, 2014, pp. 3352-3361.

* cited by examiner

CERAMIC SOFT COMPOSITES FOR SOLID-STATE BATTERIES

FIELD OF THE DISCLOSURE

This disclosure is directed to a solid-state lithium battery having a lithium metal or lithium alloy anode, a cathode, and a solid electrolyte comprised of a ceramic-organic ionic liquid crystal composite.

BACKGROUND

Solid-state batteries are electrochemical storage devices which replace a liquid electrolyte with a solid-state electrolyte since liquid electrolytes are flammable and present safety and environmental concerns. The solid electrolyte conducts lithium ($Li^+$) ions to and from an anode and a cathode of the battery during battery cycling, wherein $Li^+$ ions are shuttled from the anode side to the cathode during discharge and from the cathode to the anode during battery charge. The solid electrolyte blocks the direct conduction of electrons between electrodes within the battery. The advantages of solid-state electrolytes include increased safety, improved energy density, and the ability to use lithium metal anodes.

The capability of batteries based on the lithium ion rocking chair mechanism enables the battery to insert $Li^+$ ions into active materials during electrochemical reduction, and then to extract the $Li^+$ ions during electrochemical oxidation. The repeated insertion and extraction of the $Li^+$ ions induce inherent volume changes in the material. In liquid electrolyte batteries, the volume change of the active material has little effect on the capability of the electrolyte to continue to transport $Li^+$ ions. However, for solid-state batteries, the solid electrolyte undergoes more mechanical stress and physical degradation (e.g. cracking of the solid electrolyte layer). The cracking of the solid electrolyte may lead to battery failure by internal shorting or loss of conductivity of the solid electrolyte.

Accordingly, it would be desirable to provide a solid electrolyte having improved mechanical stress stability while exhibiting high lithium ion conductivity. Further, it would be useful to provide solid state batteries containing the solid electrolyte and methods to prepare both the solid electrolyte and the solid state battery.

SUMMARY

These and other objects are provided by the embodiments of the present disclosure, the first embodiment of which includes a composite material of formula (I):

$$(LPS)_a(OIPC)_b \qquad (I)$$

wherein
each of a and b is a mass % value from 1% to 99% such that a+b is 100%;

(LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \qquad (II)$$

X is I, C or Br, each of x and y is a mass % value of from 33.3% to 50% such that x+y is from 75% to 100% and the total mass % of $Li_2S$, $P_2S_5$ and LiX is 100%; and (OIPC) is a salt of a cation and a closo-borane cluster anion.

The present disclosure additionally relates to a method of forming a composite material of formula $(LPS)_a(OIPC)_b$, including: providing a mixture of the (LPS) and x mol % of the (OIPC), wherein x=1 to 50; heating the mixture to a temperature between a melting temperature of the (OIPC) and a crystallization temperature of the (LPS) for a predetermined length of time; and pressing the mixture with a predetermined pressure, wherein each of a and b is a mass % value from 1% to 99% such that a+b is 100%; (LPS) is a material selected from the group consisting of $Li_3PS_4$, $Li_7P_3S_{11}$, $Li_{10}GeP_2S_{11}$, and a material of formula $xLi_2S.yP_2S_5.(100-x-y)LiX$.

The present disclosure also relates to a solid-state lithium battery, comprising in the order listed:
a lithium metal or lithium alloy metal anode;
a solid-state electrolyte of formula (I); and
a cathode:

$$(LPS)_a(OIPC)_b \qquad (I)$$

wherein
each of a and b is a mass % value from 1% to 99% such that a+b is 100%;

(LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \qquad (II)$$

X is I, Cl or Br, each of x and y is a mass % value of from 33.3% to 50% such that x+y is from 75% to 100% and the total mass % of $Li_2S$, $P_2S_5$ and LiX is 100%; and (OIPC) is a salt of a cation and a closo-borane cluster anion.

The present disclosure additionally relates to a method of fabricating a solid electrolyte lithium battery, including: providing a lithium metal or lithium alloy metal anode; providing a cathode; providing an electrolyte, wherein providing the electrolyte includes: providing a mixture of the (LPS) and x mol % of the (OIPC), wherein x=1 to 50; heating the mixture to a temperature between a melting temperature of the (OIPC) and a crystallization temperature of the (LPS) for a predetermined length of time; and pressing the mixture with a predetermined pressure, wherein each of a and b is a mass % value from 1% to 99% such that a+b is 100%; (LPS) is a material selected from the group consisting of $Li_3PS_4$, $Li_7P_3S_{11}$, $Li_{10}GeP_2S_{11}$, and a material of formula $xLi_2S.yP_2S_5.(100-x-y)LiX$.

In aspects of the previous embodiments the cation of the OIPC is at least one selected from ammonium, pyrrolidinium, piperidinium, and phosphonium.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Throughout this description, the terms "electrochemical cell" and "battery" may be employed interchangeably unless the context of the description clearly distinguishes an electrochemical cell from a battery. Further the terms "solid electrolyte", "solid-state electrolyte", and "solid-state ion conductor" may be employed interchangeably unless explicitly specified differently. The term "approximately" when associated with a numerical value conveys a range from −10% of the base value to +10% of the base value.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "top" "bottom," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Organic ionic plastic crystals (OIPCs) present a suitable component with desirable electrochemical and mechanical properties for a malleable ceramic composite. In a first embodiment the present disclosure provides a composite material of formula (I):

$$(LPS)_a(OIPC)_b \quad (I)$$

wherein each of a and b is a mass % value from 1% to 99% such that a+b is 100%. According to the present disclosure, (LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%; and (OIPC) is a salt of a cation and a closo-borane cluster anion, wherein the cation is at least one selected from ammonium, pyrrolidinium, piperidinium, and phosphonium. Soft plastic OIPC solid electrolytes are described in copending application 16425096, the disclosure of which is incorporated herein by reference.

The cation may be selected from the group including: 1-methyl-1-propylpyrrolidinium (referred to hereinafter as "Pyr13"); N-methyl-N,N-diethyl-N-propylammonium (N1223); N,N-diethyl-N-methyl-N-(2-methoxyethyl)-ammonium (DEME); N-methyl-N-propylpiperidinium (referred to hereinafter as "Pip13"); N-methyl-N-(2-methoxyethyl)-pyrrolidinium (Pyr12$_o$1); trimethylisopropylphosphonium (P111$_i$4); methyltriethylphosphonium (P1222); methyltributylphosphonium (P1444); N-methyl-N-methylpyrrolidinium (Pyr12); N-methyl-N-butylpyrrolidinium (Pyr14); N,N,N-triethyl-N-hexylammonium (N2226); triethylhexylphosphonium (P2226); and N-ethyl-N,N-dimethyl-N-butylammonium (N4211). It is to be understood that, in some implementations, G can include more than one of the aforementioned cations. It is to be understood that when p equals two, the two organic cations contained in the stoichiometric unit of the solid matrix can be the same cation or can be two different cations.

As used herein, the phrase "boron cluster anion" generally refers to an anionic form of any of the following: a borane having 6-12 boron atoms with a net −2 charge; a carborane having 1 carbon atom and 5-11 boron atoms in the cluster structure with a net −1 charge; a carborane having 2 carbon atoms and 4-10 boron atoms in the cluster structure with a net −1 or −2 charge. In some variations, a boron cluster anion can be unsubstituted, having only hydrogen atoms in addition to the aforementioned. In some variations, a boron cluster anion can be substituted, having: one or more halogens replacing one or more hydrogen atoms; one or more organic substituents replacing one or more hydrogen atoms; or a combination thereof.

A method for forming the material of formula (I) includes:
providing a mixture of the (LPS) and x mol % of the (OIPC), wherein x=1 to 50;
heating the mixture to a temperature between a melting temperature of the (OIPC) and a crystallization temperature of the (LPS) for a predetermined length of time; and
pressing the mixture with a predetermined pressure.

As described in the examples, the inventors have surprisingly discovered that a distinct composite material may be obtained when materials according to (LPS) are mixed with materials according to (OIPC) to produce an (LPS)-(OIPC) composite. Thus as described in Example 1, lithium sulfide, phosphorous pentasulfide, LiX (X=Cl, I, and Br) may be combined in a mortar according to the weight % ranges described above. These components may be mixed for a time of from 10 min to 1 h in the mortar and then the resulting powder may be ball milled for a time of from 1 to 7 days to obtain the (LPS) electrolyte component. Although not considered necessary the electrolyte component may be annealed at 180° C. for up to 3 hours.

As described in Example 2, an (OIPC) electrolyte component was prepared by salt metathesis, combining a closo-borane cluster salt with an organic cation salt, which is then doped with Li salts (e.g. $LiCB_{11}H_{12}$, LiCB9H10, etc.). Excess water is added to the combination of the salts in a water-miscible solvent to precipitate the closo-borane cluster as a solid. The solid closo-borane cluster may then be isolated by methods known in the art, for example filtration, centrifugation, etc.

As described in Example 3, the composite of the (LPS) and (OIPC) electrolyte was prepared using a melt diffusion process. (LPS) powder and x mol % (OIPC) powder (where x=1 to 50) are combined and mixed in a mortar and heated to a predetermined temperature range, $T_x$, spanning a melting temperature of the (OIPC) and a crystallization temperature of the (LPS). The heat is removed from the mixture after a predetermined length of time and the mixture is cooled below $T_x$ to form the (LPS)-(OIPC) composite.

Figure 1A:
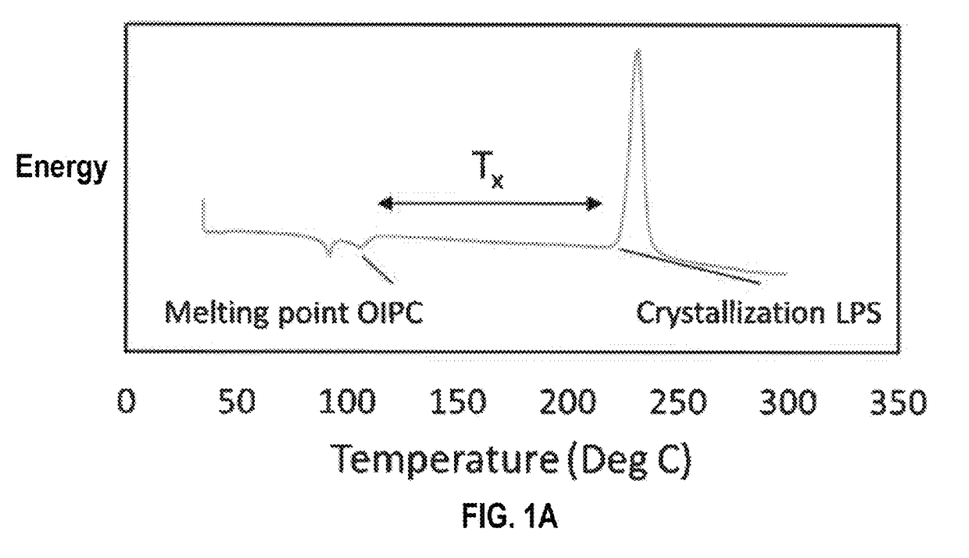
FIG. 1A shows an exemplary differential scanning calorimetry (DSC) curve relating energy input needed to maintain temperature in Celsius for a mortar-and-pestle mixed composite, according to an embodiment of the present disclosure.

FIG. 1A shows an exemplary differential scanning calorimetry (DSC) curve relating energy input needed to maintain temperature in degrees Celsius for a mixture, according to an embodiment of the present disclosure. Notably, the temperature range $T_x$ is described.

Figure 1B:
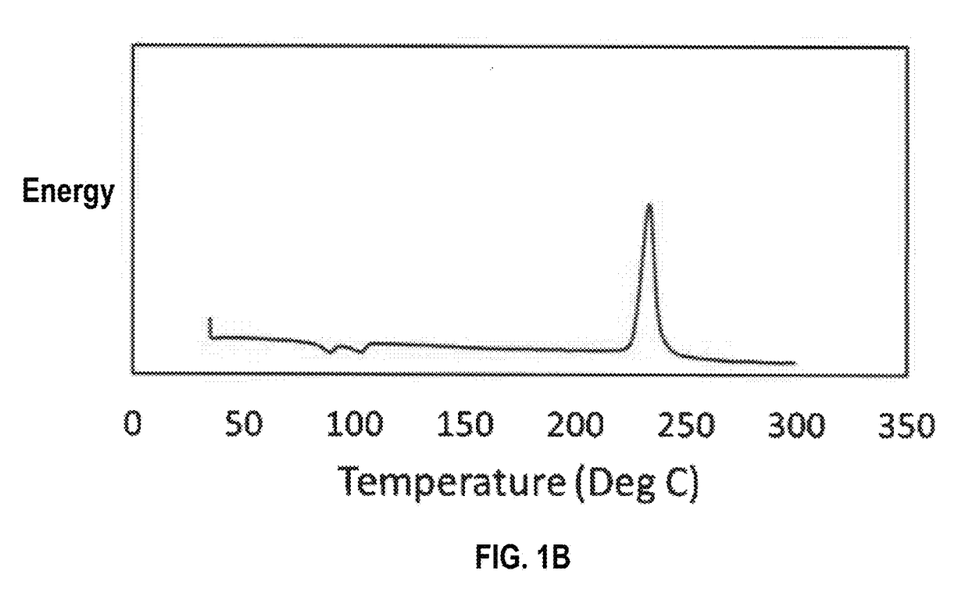
FIG. 1B shows an exemplary DSC curve of the (LPS)-(OIPC) composite after heating at a predetermined temperature range $T_x$ for 1-10 hours, according to an embodiment of the present disclosure.
Figure 2:
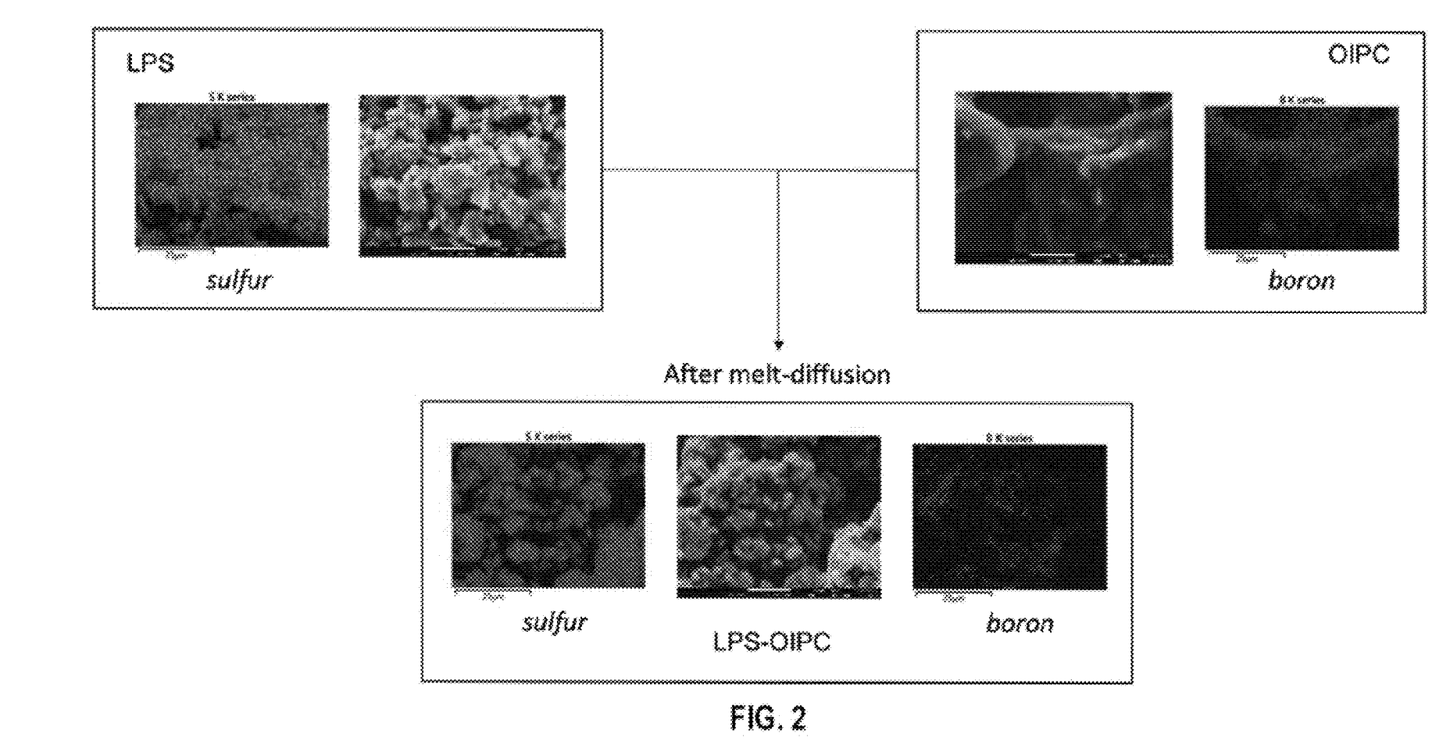
FIG. 2 shows scanning electron microscopy (SEM) images and energy-dispersive x-ray spectroscopy (EDX) maps of the (LPS) pellet, the (OIPC) powder, and the melt-diffused (LPS)-(OIPC) composite (grey-scale images), according to an embodiment of the present disclosure.

FIG. 1B shows an exemplary DSC curve of the (LPS)-(OIPC) composite after heating at $T_x$ for 1-10 hours, according to an embodiment of the present disclosure. The DSC is identical to FIG. 2a and no decomposition of the (OIPC) and (LPS) occurs. A range for Tx may be, for example, 100° C. to 225° C.

In an embodiment, the melt diffusion process produces a core-shell structure for the (LPS)-(OIPC) composite wherein the (OIPC) surrounds the (LPS) particles. Morphology of the (LPS)-(OIPC) composite is critical to producing a uniform mixture, as well as a uniform, pressed pellet as described below. In the previously described melt diffusion process, the mixture is first heated to the predetermined temperature range, $T_x$. By heating the mixture above the melting temperature of the (OIPC), the (OIPC) transitions to a liquid phase. By keeping $T_x$ below the crystallization temperature of the (LPS), the (LPS) remains in the non-crystalline phase. As such, the (OIPC) may be considered the "softer" material. This heating results in the (OIPC) liquid flowing to surround the (LPS) particles and filling any voids in the (LPS) particles and any voids formerly present when the (OIPC) was a solid. After the heat is removed and the mixture is cooled below $T_x$, the (OIPC) may return to solid form surrounding the (LPS) particles.

FIG. 2 shows scanning electron microscopy (SEM) images of the (LPS) pellet, the (OIPC) powder, and the melt-diffused (LPS)-(OIPC) composite (grey-scale images), according to an embodiment of the present disclosure. Analysis using energy dispersive x-ray spectroscopy (EDS) may be used for element identification. EDS mapping of the sulfur element (teal) shows the location of the sulfur in the (LPS), and EDS mapping of the boron element (red) shows the location of boron in the (OIPC). Combined, they evidence the formation of the core-shell morphology, wherein EDS shows that the boron (red) that's only found in the (OIPC) is coating the thiophosphate sulfur (magenta), which is only found in the (LPS).

Figure 3A:
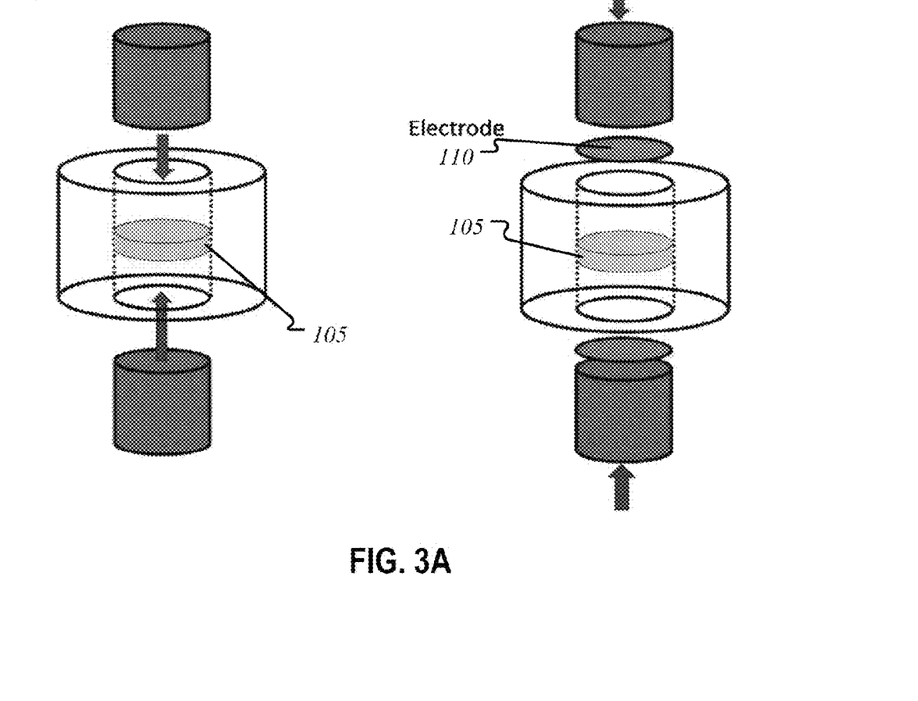
FIG. 3A describes a method of forming a solid electrolyte (LPS)-(OIPC) composite pellet, according to an embodiment of the present disclosure.

Example 4 and FIG. 3A describe a method of forming a solid electrolyte (LPS)-(OIPC) composite pellet 105 (herein referred to as "pellet 105"), according to an embodiment of the present disclosure. In an embodiment, the (LPS)-(OIPC) composites are cold-pressed. A weight of the (LPS)-(OIPC) composite, for example 80 to 300 mg, may be cold-pressed in a die using punches applying pressure to the (LPS)-(OIPC) composite over a predetermined duration of time. For example, the applied pressure may be less than 10 tons, or less than 7 tons, or 0.5 to 6 tons, or 1 to 3 tons. Notably, as the method name indicates, the pellet 105 may be pressed at ambient temperature. That is to say, the (LPS)-(OIPC) mixture may be allowed to cool to ambient temperature before being pressed. A cross-sectional shape of the resulting pellet 105 may be circular (as shown) or a polygon having greater than 2 sides. A diameter of the disc-like pellet 105 as shown may be 0.5 to 2 cm, 1.1 cm, or preferably, 1.13 cm. Electrodes 110 may be electrically coupled to the pellet 105 on opposing sides. For example, a first electrode 110 may contact a top surface and a second electrode 110 may contact a bottom surface (as shown) and current is conducted orthogonal to the top and bottom surfaces. In another example, electrodes 110 may contact opposing edges of the pellet 105 and current is conducted parallel to the top and bottom surfaces. Other electrode 110 connection configurations may be contemplated by those skilled in the art. Using electrodes 110, for example wherein electrodes 110 are blocking electrodes, conductivity measurements were performed using electrochemical impedance spectroscopy (EIS).

Figure 3B:
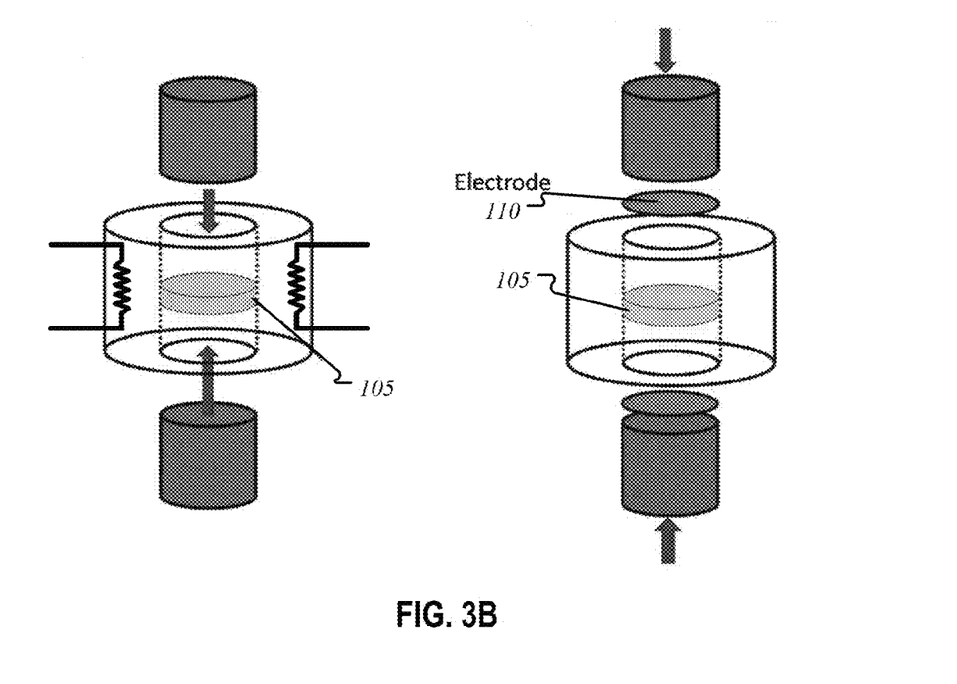
FIG. 3B shows a method of forming a pellet in the presence of heat, according to an embodiment of the present disclosure.

FIG. 3B shows a method of forming the pellet 105 in the presence of heat, according to an embodiment of the present disclosure. In an embodiment, (LPS)-(OIPC) composites are hot-pressed, wherein the die includes a heating mechanism that heats the (LPS)-(OIPC) composite during the pressing. Heating may be provided by general heating devices, for example resistive heating coils (as shown), an induction furnace, an applied electric field, etc., or any combination thereof. As previously described, the mixture may be heated to the predetermined temperature range, $T_x$. Heating the mixture above the melting temperature of the (OIPC) transitions the mixture to the liquid phase. Keeping $T_x$ below the crystallization temperature of the (LPS) keeps the (LPS) in the non-crystalline phase. Advantageously, the heated press and applied pressure may facilitate the (OIPC) flowing to surround the (LPS) particles and filling voids, especially if the mixture is held at the elevated temperature for a prolonged period of time. In addition, the combined heat and pressure may transition the (OIPC) to an alternative phase prior to cooling, thereby altering its structure and ultimately its conductivity. In yet another embodiment, the (OIPC) may be heated and pressed for the predetermined duration of time, and subsequently quenched in order to yield a desired phase or retain a desired crystalline structure for the (OIPC). For example, the (OIPC) may include variations in the rotational freedom of the cations and adjusting the temperature and pressure of the press may induce nucleation and growth of a new lattice structure in the (OIPC) with improved relative density and conductivity.

Figure 4:
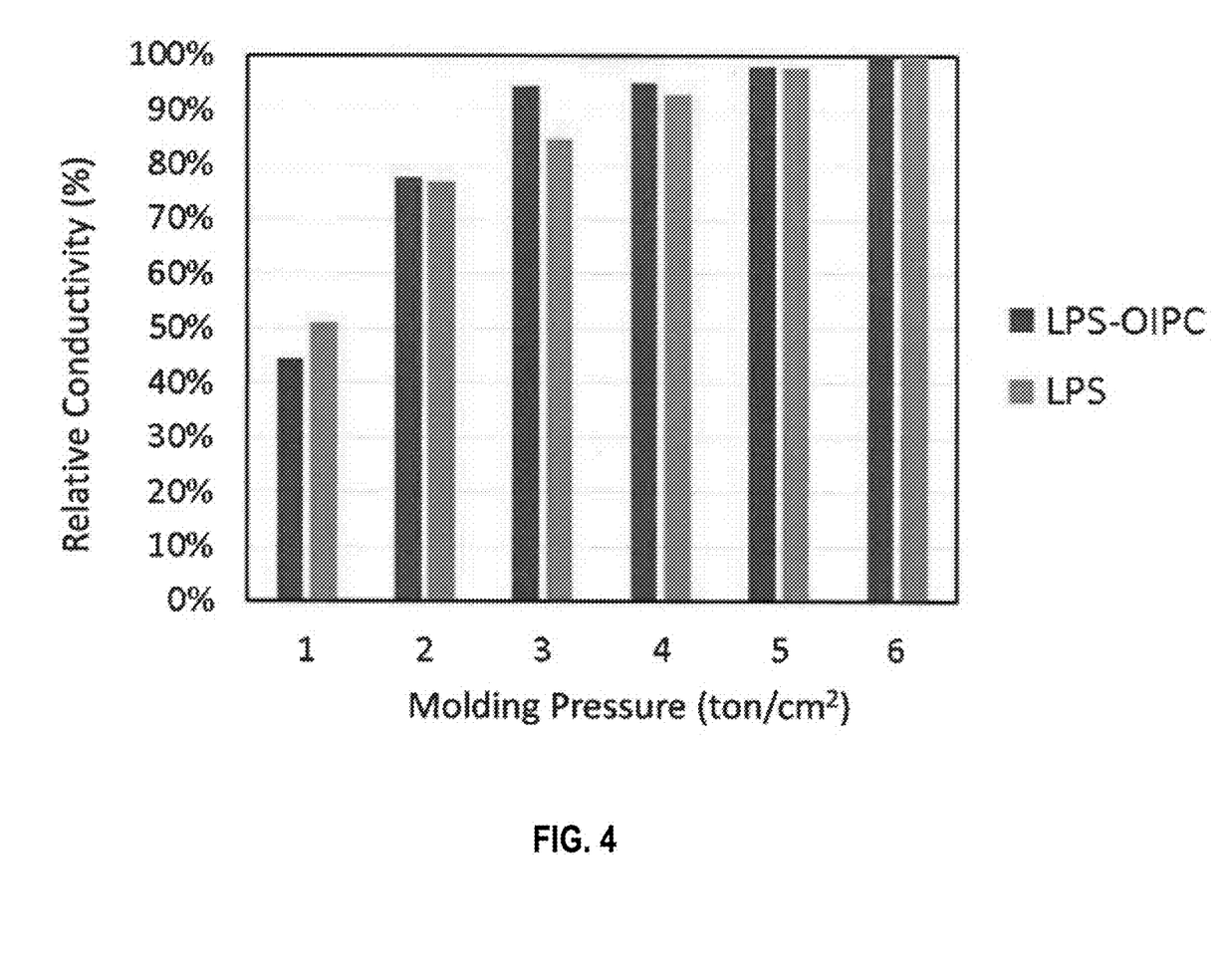
FIG. 4 shows a comparison of relative conductivity between (LPS) and (LPS)-(OIPC) composite, according to an embodiment of the present disclosure.

FIG. 4 shows a comparison of relative conductivity between (LPS) and (LPS)-(OIPC) composite, according to an embodiment of the present disclosure. The relative conductivity, as a percentage, is given in relation to the molding pressure, which is in measured as tons/cm$^2$. The (LPS)-(OIPC) composite can reach higher, relative conductivity at lower pressures as compared to the (LPS), most notably from applied pressures as low as 2 to 4 tons/cm$^2$. For example, to achieve a similar relative conductivity as the (LPS)-(OIPC) composite pressed at 3 tons/cm$^2$ the (LPS) may use more than 4 tons/cm$^2$ of pressure.

Figure 5:
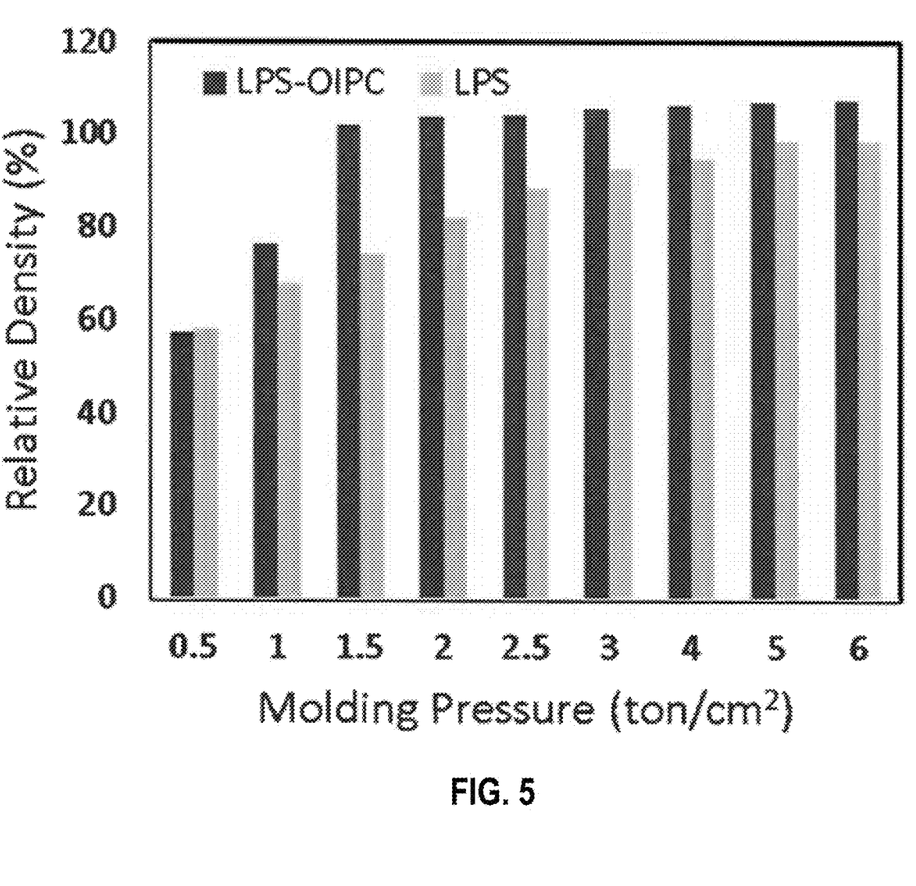
FIG. 5 shows the relative density comparison between (LPS) and a (LPS)-(OIPC) composite, according to an embodiment of the present disclosure.

FIG. 5 shows the relative density comparison between the (LPS) and the (LPS)-(OIPC) composite, according to an embodiment of the present disclosure. As described in Example 5, geometrical measurements are taken of the (LPS) and LSP-OIPC composite pellets 105 pressed at varying molding pressures. Notably, the (LPS)-(OIPC) composite can reach higher, relative density at lower pressures when compared to the (LPS). FIG. 5 demonstrates this higher relative density for the (LPS)-(OIPC) composite when the molding pressure is as low as 0.5 tons/cm$^2$ or higher. For example, to achieve a similar relative density as the (LPS)-(OIPC) composite pressed at 1.5 tons/cm$^2$, the (LPS) may use more than 6 tons/cm$^2$ of pressure, or more than 4 times as much pressure as the (LPS)-(OIPC). In summary, the pressing of the pellet 105 under the applied pressure to achieve the desired relative density may lend to improved mechanical properties and conductivity for the solid electrolyte.

Figure 6A:
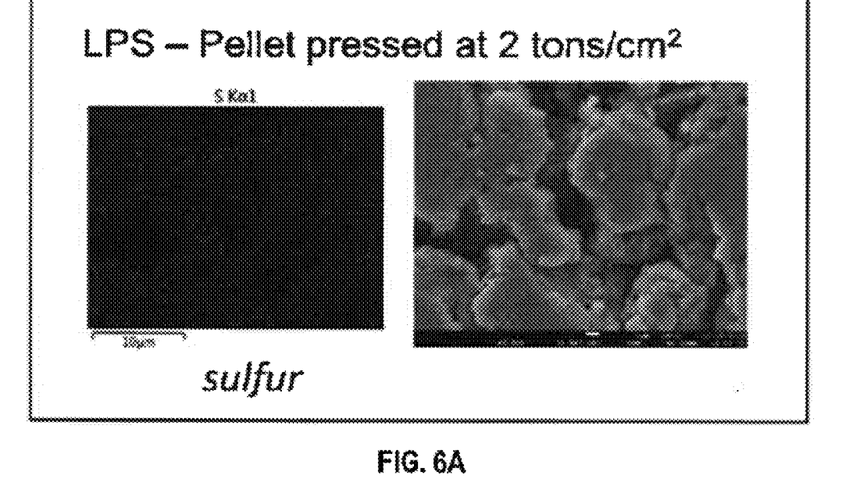
FIG. 6A shows an SEM image and energy-dispersive x-ray spectroscopy (EDX) map of a (LPS) powder, according to an embodiment of the present disclosure.
Figure 6B:
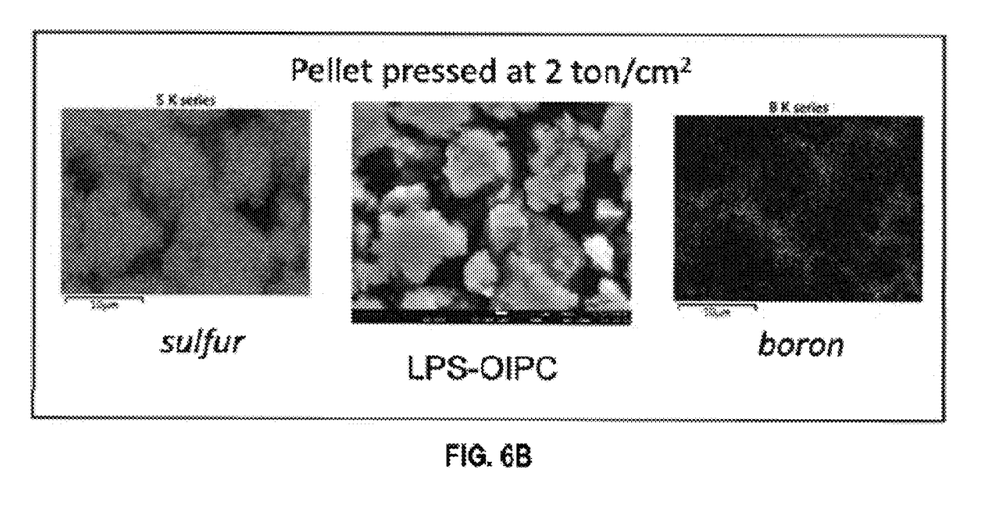
FIG. 6B shows an SEM image and energy-dispersive x-ray spectroscopy (EDX) maps of a (LPS)-(OIPC) composite, according to an embodiment of the present disclosure.

FIGS. 6A and 6B show the relative density of the pellets 105 via SEM images, according to an embodiment of the present disclosure. As described in Example 6, improved conductivity and density of the (OIPC) and (LPS) results from thorough powder mixing and uniformity of the mixture extending through the pellet 105. This forms the core-shell structure morphology evidenced in the SEM images, wherein the voids where lithium ions cannot conduct through are reduced. FIG. 6A shows an SEM image of the (LPS) powder pressed at 2 tons/cm$^2$, and EDS of sulfur elements (purple) shows the location of the (LPS), which visually demonstrates the presence of voids. FIG. 6B shows an SEM image of the (LPS)-(OIPC) composite powder pressed at the same pressure of 2 tons/cm$^2$, and EDS of sulfur elements (green) shows the location of the (LPS) while EDS of boron elements (blue) shows the location of the (OIPC). FIG. 6B demonstrates that the (OIPC) is able to infiltrate the voids in the (LPS), thus improving the relative density of the material and essentially forming a bridge between (LPS) particles. This higher relative density core-shell structure morphology leads to improved conductivity for the (LPS)-(OIPC) composite at lower molding pressures than (LPS).

Figure 7:
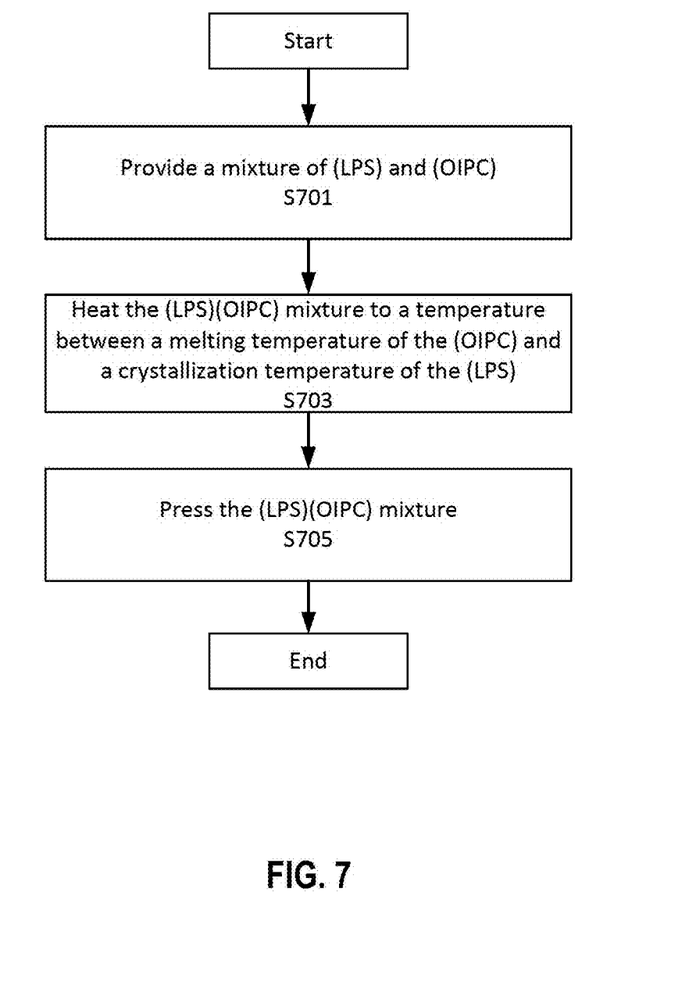
FIG. 7 shows a flow diagram of a method for fabricating a (LPS)-(OIPC) composite, according to an embodiment of the present disclosure.

FIG. 7 shows a flow diagram for fabricating the (LPS)-(OIPC) composite, according to an embodiment of the present disclosure. In step S701, a mixture of the (LPS)-(OIPC) is provided. For example, a mixture of the (LPS) and x mol % of the (OIPC), wherein x=1 to 50 is provided. In step S703, the (LPS)-(OIPC) mixture is heated to form the (LPS)-(OIPC) composite. For example, the (LPS)-(OIPC) mixture is heated to a temperature between 100° C. and 225° C. In step S705, the (LPS)-(OIPC) mixture is pressed under pressure. For example, the pressure is less than 5 tons/cm$^2$. For example, the pressure is less than 3 tons/cm$^2$. For example, the pressure is preferably 2 tons/cm$^2$. It may be appreciated that the aforementioned steps need not proceed as described and numerically labeled above and in FIG. 7, and instead may be performed in an alternative sequence. For example, the mixture may be pressed under pressure and subsequently heated to form the (LPS)-(OIPC) composite in yet another form of hot-pressing. After forming the (LPS)-(OIPC) composite, the (LPS)-(OIPC) composite may be electrically connected to electrodes and used as the electrolyte in a battery. Notably, the (LPS)-(OIPC) composite includes having improved mechanical stress stability while exhibiting high lithium ion conductivity.

In one embodiment, the present disclosure provides a solid state lithium battery containing a lithium metal or lithium alloy metal anode;

a solid-state electrolyte of formula (I); and
a cathode:

$$(LPS)_a(OIPC)_b \quad (I)$$

wherein
each of a and b is a mass % value from 1% to 99% such that a+b is 100%;
(LPS) is a material selected from the group consisting of Li$_3$PS$_4$, Li$_7$P$_3$S$_{11}$, Li$_{10}$GeP$_2$S$_{11}$, and a material of formula (II):

$$xLi_2S.yP_2S_5.(100-x-y)LiX \quad (II)$$

X is I, Cl or Br, each of x and y is a mass % value of from 33.3% to 50% such that x+y is from 75% to 100% and the total mass % of Li$_2$S, P$_2$S$_5$ and LiX is 100%; and (OIPC) is a salt of a cation and a closo-borane cluster anion. The composition of the OIPC cation and closo-borane cluster anion is as previously described.

The anode may comprise a current collector; and an electrode active layer on the current collector; wherein the electrode active layer comprises lithium metal or a lithium metal alloy. The current collector may be any conductive metal or conductive polymer conventionally employed as current collector components.

The cathode may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur, other chalcogenides, such as selenium and tellurium and metal sulfide composites. The cathode may be constructed according to methods conventionally known in the art and may include conductive carbon and a binder. The cathode may also include a current collector such as copper, aluminum and stainless steel.

In one special aspect, the active cathode material may comprise elemental sulfur as the basic active ingredient. Conventionally known additives such as binders and conductive carbon materials may be included.

Thus, in another embodiment, the present disclosure provides a method of fabricating a solid electrolyte lithium battery, including:
providing a lithium metal or lithium alloy metal anode;
providing a cathode;

providing an electrolyte, wherein providing the electrolyte includes:

provisioning a mixture of the (LPS) and x mol % of the (OIPC), wherein x=1 to 50;

heating the mixture to a temperature between a melting temperature of the (OIPC) and a crystallization temperature of the (LPS) for a predetermined length of time; and pressing the mixture with a predetermined pressure, wherein each of a and b is a mass % value from 1% to 99% such that a+b is 100%;

(LPS) is a material selected from the group consisting of $Li_3PS_4$, $Li_7P_3S_{11}$, $Li_{10}GeP_2S_{11}$, and a material of formula $xLi_2S.yP_2S_5.(100-x-y)LiX$.

The anode comprised a current collector; and an electrode active layer on the current collector; wherein the electrode active layer comprises lithium metal or a lithium metal alloy. The current collector may be any conductive metal or conductive polymer conventionally employed as current collector components.

The cathode may be any conventionally employed in lithium ion batteries, including but not limited to composite lithium metal oxides such as, for example, lithium cobalt oxide ($LiCoO_2$), lithium manganese oxide ($LiMn_2O_4$), lithium iron phosphate ($LiFePO_4$) and lithium nickel manganese cobalt oxide. Other active cathode materials may also include elemental sulfur, other chalcogenides, such as selenium and tellurium and metal sulfide composites. The cathode may be constructed according to methods conventionally known in the art and may include conductive carbon and a binder. The cathode may also include a current collector such as copper, aluminum and stainless steel.

In one special aspect, the active cathode material may comprise elemental sulfur as the basic active ingredient. Conventionally known additives such as binders and conductive carbon materials may be included.

EXAMPLES

Example 1—Synthesis of the (LPS)

LPS is a material selected from the group consisting of $Li_3PS_4$, $Li_7P_3S_{11}$, $Li_{10}GeP_2S_{11}$, and a material of formula (II): $xLi_2S.yP_2S_5.(100-x-y)LiX$ wherein X is I, Cl or Br, each of x and y is a mass % value of from 33.3% to 50% such that x+y is from 75% to 100% and the total mass % of $Li_2S$, $P_2S_5$ and LiX is 100%. The starting materials, $Li_2S$, $P_2S_5$ and $GeS_2$ are ball-milled for 1-7 days.

Example 2—Synthesis of (OIPC)

Salts that are based on organic cations with flexible and/or asymmetrical substituents are combined with closo-borane anions such as $CB_{11}H_{12}^-$, $CB_9H_{10}^-$ or $B_{12}H_{12}^{2-}$. The cations can be based on ammonium, pyrrolidinium, piperidinium and phosphonium. The resulting material is doped with Li salts such as $LiCB_{11}H_{12}$ or $LiCB_9H_{10}$. Different types of closo-boron cluster salts paired with an organic cation are synthesized by salt metathesis between a solution of a boron cluster salt (typically, but not restricted, paired with an alkaline or earth alkaline cation) with a solution of an organic cation salt (typically, but not restricted, paired with a halide anion). When the combination of those two salts in a solvent miscible with water is added excess water, the organic salt of the closo-boron cluster separates as a solid precipitate and can be isolated by known methods, such as filtration or centrifugation.

Example 3—Synthesis of (LPS)-(OIPC) Composites

Composites of (LPS)-(OIPC) are synthesized by the melt diffusion process. First, (LPS) powder and x mol % (OIPC) powder (where x=1 to 50) are combined in a mortar. Then, the resulting mixture is heated at between the melting temperature of the (OIPC)(100°) C) and the crystallization of the (LPS) (225° C.). This range is called $T_x$. FIG. 1A shows a DSC of a mortar mixed sample. An example of the heating range $T_x$ of for the composite is shown. FIG. 2B shows a DSC of a composite after heating at $T_x$ for 1-10 hours. The DSC is identical to FIG. 1A and no decomposition of the (OIPC) and (LPS) is observed.

The morphology of the composite is related to producing a uniform mixture, as well as a uniform, pressed pellet. The morphology of the melt-diffused composite is a core-shell structure with the (OIPC) material surrounding the (LPS) particles. FIG. 2 shows SEM images of the (LPS), the (OIPC), and the melt-diffused composite. EDS mapping of the sulfur element shows the location of the sulfur in the (LPS), and EDS mapping of the boron element shows the location of the boron in the (OIPC). Combined, they evidence the formation of the core-shell morphology.

Example 4—Conductivity of (LPS)-(OIPC) Composites

Forming (LPS)-(OIPC) composite improves the conductivity at lower molding pressures. Therefore, to measure this property, conductivity measurements are performed on (LPS) and (LPS)-(OIPC) composites. First, 80 to 300 mg of (LPS) or (LPS)-(OIPC) composites were cold-pressed into a 1.128 cm diameter pellet using 1 to 6 tons of pressure. Conductivity measurements were performed using a EIS and blocking electrodes. A schematic is shown in FIG. 3A. FIG. 4 shows the comparison between relative conductivity as a percentage and molding pressure in tons/cm² for (LPS) and (LPS)-(OIPC) composites. Notably, the composite mixture can reach higher, relative conductivity at lower pressures.

Example 5—Relative Density of (LPS)-(OIPC) Composites

The purpose of forming (LPS)-(OIPC) is to improve the relative density of pressed-pellets at lower molding pressures. Therefore, to measure this property, geometrical measurements are taken to calculate the relative density of (LPS) and (LPS)-(OIPC) composites pressed at different molding pressures. FIG. 5 shows the comparison between relative density as a percentage and molding pressure in tons/cm² for (LPS) and (LPS)-(OIPC) composites. Notably, the composites can reach higher, relative density at lower pressures.

Example 6—Mechanism of Improved Conductivity and Relative Density

For improved conductivity and density, the (OIPC) and (LPS) are to be well mixed, and the uniformity should extend through the pellet after pressing of the powdered materials. The core-shell morphology is important to form uniform pellets. FIG. 6A is an SEM image that shows the (LPS) powder pressed at 2 tons/cm². EDS of sulfur shows the location of the (LPS). The SEM image and EDS evidence that the pellet contains many voids. FIG. 6B is an SEM image that shows a (LPS)-(OIPC) composite powder pressed at 2 tons/cm². EDS of sulfur shows the location of (LPS) while the EDS of boron shows the location of (OIPC). The SEM images and EDS show that the (OIPC) can fill the voids between the (LPS) particles, thus improving the conductivity and relative density.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A composite material of formula (I):

$$(LPS)_a(OIPC)_b \quad (I)$$

wherein each of a and b is a mass % value from 1% to 99% such that a+b is 100%, (LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

X is I, Cl or Br, each of x and y is a mass % value of from 33.3% to 50% such that x+y is from 75% to 100% and the total mass % of $Li_2S$, $P_2S_5$ and LiX is 100%

(OIPC) is a salt of a cation and a closo-borane cluster anion, and the cation is at least one selected from ammonium, pyrrolidinium, piperidinium, and phosphonium.

2. The composite of claim 1, wherein the $(LPS)_a(OIPC)_b$ is pressed with a pressure less than 5 tons/cm².

3. The composite of claim 2, wherein the $(LPS)_a(OIPC)_b$ is pressed with a pressure less than 2.5 tons/cm².

4. The composite of claim 1, wherein the melting temperature of the (OIPC) is 100° C. and the crystallization temperature of the (LPS) is 225° C.

5. The composite of claim 1, wherein the composite material forms a core-shell structure with the (OIPC) surrounding the (LPS) particles.

6. The composite of claim 1, wherein the composite is cold-pressed.

7. The composite of claim 1, wherein the composite material is hot-pressed.

8. A composite material of formula (I):

$$(LPS)_a(OIPC)_b \quad (I)$$

wherein each of a and b is a mass % value from 1% to 99% such that a+b is 100%, (LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

X is I, Cl or Br, each of x and y is a mass % value of from 33.3% to 50% such that x+y is from 75% to 100% and the total mass % of $Li_2S$, $P_2S_5$ and LiX is 100%, (OIPC) is a salt of a cation and a closo-borane cluster anion, and the composite material forms a core-shell structure with the (OIPC) surrounding the (LPS) particles.

9. The composite of claim 8, wherein the cation is at least one selected from ammonium, pyrrolidinium, piperidinium, and phosphonium.

10. The composite of claim 8, wherein the $(LPS)_a(OIPC)_b$ is pressed with a pressure less than 5 tons/cm².

11. The composite of claim 10, wherein the $(LPS)_a(OIPC)_b$ is pressed with a pressure less than 2.5 tons/cm².

12. The composite of claim 8, wherein the melting temperature of the (OIPC) is 100° C. and the crystallization temperature of the (LPS) is 225° C.

13. The composite of claim 8, wherein the composite is cold-pressed.

14. The composite of claim 8, wherein the composite material is hot-pressed.

* * * * *